(12) United States Patent
Benichou et al.

(10) Patent No.: US 11,753,559 B2
(45) Date of Patent: Sep. 12, 2023

(54) TITANIUM INKS, METHODS OF MAKING AND USING THE SAME TO MAKE TITANIUM ARTICLES

(71) Applicant: Xjet Ltd., Rehovot (IL)

(72) Inventors: Axel Benichou, Guivatayim (IL); Sven Rühle, Tel Aviv (IL); Tali Aqua, Rehovath (IL)

(73) Assignee: XJET LTD., Rehovot (IL)

( * ) Notice: Subject to any disclaimer, the term of this patent is extended or adjusted under 35 U.S.C. 154(b) by 288 days.

(21) Appl. No.: 17/322,304

(22) Filed: May 17, 2021

(65) Prior Publication Data

US 2021/0363370 A1 Nov. 25, 2021

Related U.S. Application Data

(62) Division of application No. 15/551,239, filed as application No. PCT/IB2016/000299 on Feb. 16, 2016, now Pat. No. 11,059,984.

(Continued)

(51) Int. Cl.
*C09D 11/00* (2014.01)
*C09D 11/38* (2014.01)
(Continued)

(52) U.S. Cl.
CPC .............. *C09D 11/38* (2013.01); *B22F 1/107* (2022.01); *B22F 1/145* (2022.01); *B22F 10/14* (2021.01);
(Continued)

(58) Field of Classification Search
USPC ........................................... 106/31.01, 31.13
See application file for complete search history.

(56) References Cited

U.S. PATENT DOCUMENTS 9,017,563 B2 4/2015 Ushioda et al.
9,301,390 B2 3/2016 Takahashi et al.
(Continued)

FOREIGN PATENT DOCUMENTS

CN 101772812 A 7/2010
CN 102365733 A 2/2012
(Continued)

OTHER PUBLICATIONS

International Search Report, dated Aug. 16, 2007, for International Application No. 2016800105797 (2 pages).

(Continued)

*Primary Examiner* — James E McDonough
(74) *Attorney, Agent, or Firm* — BROWDY AND NEIMARK, P.L.L.C.

(57) ABSTRACT

Ti ink compositions for printing, such as ink jet printing, are disclosed. The ink compositions comprise a liquid dispersion of Ti hydride powder having a mean particle size of less than 10.0 microns; a liquid carrier, and at least one surfactant. Methods of making and using the disclosed inks are also disclosed. For example, a finished Ti product can be produced by printing the disclosed ink composition, such as by ink jet printing, to form a green article, heating the green article to dehydrogenate it and form a Ti containing part. The method may further comprise sintering the Ti containing part to produce a sintered Ti product. In an embodiment, the method comprises printing one or more support materials for the ink composition, that comprises solid particles of a metal oxide, a metal carbide, a metal nitride, a polymer, or combinations thereof.

10 Claims, 3 Drawing Sheets

Related U.S. Application Data

(60) Provisional application No. 62/274,409, filed on Jan. 4, 2016, provisional application No. 62/116,575, filed on Feb. 16, 2015.

(51) Int. Cl.

| | | |
|---|---|---|
| *C09D 11/36* | (2014.01) | |
| *C09D 11/322* | (2014.01) | |
| *B22F 1/107* | (2022.01) | |
| *B22F 1/145* | (2022.01) | |
| *B22F 10/14* | (2021.01) | |
| *B22F 12/53* | (2021.01) | |
| *B22F 12/55* | (2021.01) | |
| *B22F 10/43* | (2021.01) | |

(52) U.S. Cl.
CPC ............ *C09D 11/322* (2013.01); *C09D 11/36* (2013.01); *B22F 10/43* (2021.01); *B22F 12/53* (2021.01); *B22F 12/55* (2021.01); *B22F 2998/10* (2013.01); *B22F 2999/00* (2013.01); *Y02P 10/25* (2015.11)

(56) References Cited

U.S. PATENT DOCUMENTS

| | | | |
|---|---|---|---|
| 9,374,893 B2 | 6/2016 | Takahash | |
| 2002/0004539 A1* | 1/2002 | Smith | .................. C09D 11/101 |
| | | | 523/161 |
| 2010/0061925 A1 | 3/2010 | Lee | |
| 2012/0015152 A1* | 1/2012 | Takahashi | ............... C04B 41/90 |
| | | | 427/266 |
| 2012/0321805 A1* | 12/2012 | Takahashi | ............... H01B 1/026 |
| | | | 252/512 |
| 2014/0251428 A1* | 9/2014 | Lindstrom | ........... H01G 9/2022 |
| | | | 438/98 |
| 2014/0360762 A1 | 12/2014 | Lee | |
| 2015/0328684 A1* | 11/2015 | Moxson | .................... B22F 1/12 |
| | | | 419/38 |

FOREIGN PATENT DOCUMENTS

| | | |
|---|---|---|
| CN | 102783256 A | 11/2012 |
| CN | 102858093 A | 1/2013 |
| CN | 104025223 A | 9/2014 |
| DE | 102013004182 A1 | 9/2014 |
| JP | 2013084551 A | 5/2013 |
| WO | WO-2009/017648 A1 | 2/2009 |
| WO | WO-2009/020464 A9 | 2/2009 |

OTHER PUBLICATIONS

"Preparation of superfine TiH2 powder with high energy ball milling" Datasheet [online]. TriTrust Industrial, Oct. 9, 2014 [retrieved on Mar. 7, 2016].

B. Y. Ahn et al. Printed Origami Structures. Adv. Mater. 2010, 22, 2251-2254.

Hong, E. et al. Microstructure and Mechanical Properties of Reticulated Titanium Scrolls. Adv. Eng. Mater., Dec. 2011, vol. 13, issue 12 pp. 1122-1127.

* cited by examiner

TITANIUM INKS, METHODS OF MAKING AND USING THE SAME TO MAKE TITANIUM ARTICLES

CROSS-REFERENCE TO RELATED APPLICATION

This application is a divisional of U.S. application Ser. No. 15/551,239, filed Aug. 15, 2017, which claims the benefit of U.S. national application of PCT/IB2016/000299, filed Feb. 16, 2016, which claims the benefit of U.S. Patent Provisional Application No. 62/116,575, filed Feb. 16, 2015, and U.S. Provisional Application No. 62/274,409, filed Jan. 4, 2016, all of which are incorporated herein by reference in their entirety.

TECHNICAL FIELD

The present disclosure relates generally to titanium-containing inks used in ink jet printing, methods of making and methods of using the disclosed inks to print titanium objects, which are subsequently heat treated to form solid titanium parts.

BACKGROUND

Titanium (Ti), in both its pure and in its alloyed form, is attractive in industrial applications because of its excellent mechanical properties. These properties include high stiffness and specific strength, which is almost double that of steels, while the density is nearly half. In addition, Ti has excellent corrosion resistance, good creep and fatigue qualities, high fracture toughness, and biocompatibility, making it a material useful in diverse applications from the aerospace to the medical devices. In addition, titanium is attractive because it can be fabricated into objects using a number of different techniques. For example, powder metallurgy (PM) offers the possibility of creating net shape Ti parts without the material loss and cost associated with machining intricate components from a wrought billet.

Ti articles can also be fabricated using a metal additive manufacturing process, commonly known as powder bed printing. Exemplary processes include direct metal laser sintering, selective laser sintering, selective laser melting, and electron beam melting. Laser based processes require the use of high power lasers to at least partially melt and fuse adjacent Ti powder particles in order to get a final solid part. Electron beam melting requires heating the powder bed to achieve reasonable printing speed.

Other known processing techniques include binder-jetting and drop-on-powder technology in which the spreading of a thin layer of powder on a substrate plate is followed by an inkjet head scan which deposits droplets of liquid binding material across the powder bed. In this type of process, the binder, not the metal component is deposited with an inkjet head. Similarly, Carreno et al (Three-dimensional printing of shape memory alloy; E. Carreno-Morelli, S. Marinerie and J. E. Bidaux; Material Science Forum Vols. 534-536 (2007) pp. 477-480) describes dispensing a solvent only from an inkjet head into a powder bed of pre-alloyed metal powder. The prior art has yet to describe the deposition of metal directly from an inkjet head primarily because Ti containing inks exhibiting the requisite Ti particle size, and stability properties have been unattainable.

To overcome the foregoing deficiencies, the Inventors have discovered novel Ti containing inks that allow for the direct printing of Ti-based parts, such as by inkjet printing.

Thus, the disclosed titanium containing inks and methods of making and using the same are directed to overcoming one or more of the problems set forth above and/or other problems of the prior art.

SUMMARY

In part to address the foregoing needs, the present disclosure is directed to an ink composition for direct printing of Ti-based parts, such as by ink-jet printing. In an embodiment, the ink composition comprises a liquid dispersion of Ti hydride powder having a mean particle size of less than 10.0 microns; a liquid carrier; and at least one surfactant.

In another embodiment, there is disclosed a method of making a Ti containing ink composition as described herein. The method comprises providing a Ti hydride powder having a mean particle size of less than 10.0 microns; dispersing the Ti hydride powder in a liquid carrier to form a dispersion; and adding at least one surfactant to the dispersion to form an ink composition.

In yet another embodiment, there is disclosed a method of making a Ti product by inkjet printing. This method comprises printing an ink composition comprising a dispersion of Ti hydride powder having a mean particle size of less than 10.0 microns to form a green article; heating the green article to form a Ti-containing part. In an embodiment, heating the green article comprises at least one step to debind, and/or to dehydrogenate the article. Heating can also be used to sinter the article and produce a Ti product. The present disclosure is also directed to a finished Ti particle produced by the methods described herein.

Aside from the subject matter discussed above, the present disclosure includes a number of other features such as those explained hereinafter. Both the foregoing description and the following description are exemplary only.

BRIEF DESCRIPTION OF THE DRAWINGS

The accompanying figures are incorporated in, and constitute a part of this specification.

DETAILED DESCRIPTION

Figure 1:
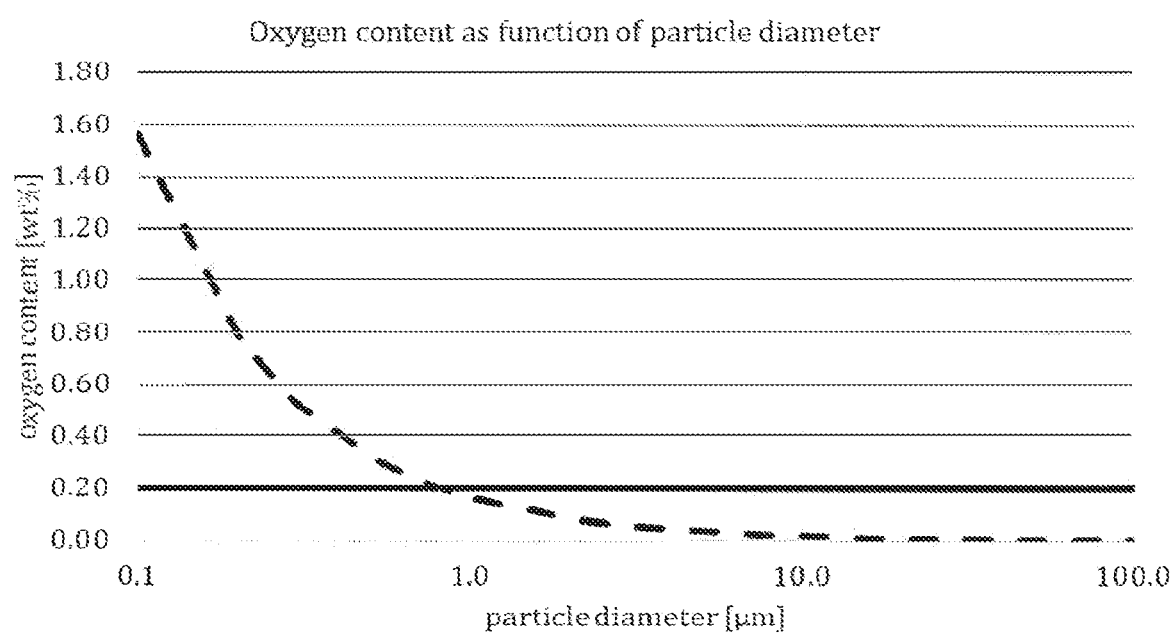
FIG. 1 is a graph showing the oxygen content in a metal powder as a function of the particle diameter, assuming a metal oxide layer at the particle surface.

As described in more detail below, the Inventors have discovered the advantages of using hydrogenated Ti to manufacture Ti objects using ink jetting techniques. In particular, Ti hydride-containing inks overcome challenges of manufacturing Ti objects via wet ink inkjet printing included grinding Ti particles to the inkjet required size. The disclosed Ti hydride-containing inks overcome previous challenges by protecting the Ti particles from oxidation, thereby mitigating the chances that these particles will combust during ink preparation and ink printing.

Titanium Material

There are disclosed various ink formulations comprising micron and submicron size particles of Ti, $TiH_2$ and their alloys. Using the common Ti-based phases present at room temperature, Ti and its alloys are generally divided into four classes: (1) chemically pure, (2) alpha, (3) alpha-beta, and (4) beta. Each phase has distinctive characteristics from the other, thereby providing Ti with the flexibility to be used in a broad range of applications. For example, pure titanium, which is also referred to as chemically pure or "CP," while very ductile, has low strength. Accordingly, this phase is typically used when strength is not the most critical characteristic, and corrosion resistance, cost, ease of fabrication, and welding are characteristics that are desired. The alpha alloys are weldable and have good elevated-temperature strengths. The alpha-beta alloys are widely used because of their good combinations of strength, toughness, and formability. The beta alloys are useful where very high tensile strengths are required.

In addition to CP Ti, any single alloy or any combination of alloys having the foregoing phases can be used in the ink compositions described herein. For example, in one embodiment, the Ti comprises an alloy, with Ti-6Al-4V (referred to herein as "Ti 64"), being particularly noted. The alloy, which is one of the most commonly used Ti alloy, has a chemical composition of 6% aluminum, 4% vanadium, 0.25% (maximum) iron, 0.2% (maximum) oxygen, and the remainder titanium. It is significantly stronger than commercially pure titanium while having the same stiffness and thermal properties, excluding thermal conductivity, which is about 60% lower in Ti than in CP Ti. Among its many advantages, Ti64 is heat treatable. The excellent combination of strength, corrosion resistance, weldability and ease of fabrication, allow this alloy to be printed to make a variety of parts that can benefit from such properties, such as parts to be used in the biomedical, automotive or aviation industry including blades, discs, rings, airframes, fasteners, components, vessels, cases, hubs, forgings, and biomedical implants.

Non-limiting examples of other alloys that can be used in the disclosed inks include the following:

a. 5% aluminum and 2.5% tin, and thus is known as Ti-5Al-2.5Sn. This alloy can be used in airframes and jet engines due to its good weldability, stability and strength at elevated temperatures;
b. 0.12 to 0.25% palladium. This grade is similar to a pure Ti with the small quantity of palladium gives it enhanced crevice corrosion resistance at low temperatures and high pH1;
c. 3.0% aluminum and 2.5% vanadium. This grade provides a compromise between the ease of welding and manufacturing of the "pure" grades and the high strength. It is commonly used in aircraft tubing for hydraulics and in athletic equipment
d. Alloys having small amounts of palladium to enhance corrosion resistance. For example, in one embodiment, the Ti alloy comprises 0.12 to 0.25% palladium. In another embodiment, the Ti alloy that can be used herein comprises 0.04 to 0.08% palladium;
e. 0.3% molybdenum and 0.8% nickel. In other embodiments, the Ti alloy that can be used herein comprises contain 0.5% nickel and 0.05% ruthenium;
f. Alloys having aluminum and vanadium, alone or in combination with other alloying elements. For example, alloys comprising 3% aluminum, 2.5% vanadium and 0.04 to 0.08% palladium. These alloys have excellent mechanical characteristics, with the palladium providing increased corrosion resistance;
g. 3% aluminum, 8% vanadium, 6% chromium, 4% zirconium, and 4% molybdenum. Alternatively, the alloy may comprise 3% aluminum, 8% vanadium, 6% chromium, 4% zirconium, 4% molybdenum and 0.04% to 0.08% palladium;
h. 6% aluminum, 4% vanadium, 0.13% (maximum) oxygen. This alloy exhibits improved ductility and fracture toughness with some reduction in strength;
i. 6% aluminum, 4% vanadium and 0.04% to 0.08% palladium;
j. 6% aluminum, 4% vanadium and 0.3% to 0.8% nickel and 0.04% to 0.08% palladium;
k. Alloys having small amounts ruthenium, such as in amounts ranging from 0.08 to 0.14% ruthenium. For example, in an embodiment, the alloy may comprise 3% aluminum, 2.5% vanadium and 0.08 to 0.14% ruthenium. In another embodiment, the alloy may comprise 6% aluminum, 4% vanadium and 0.08 to 0.14% ruthenium;
l. 4% aluminum, 2.5% vanadium, and 1.5% iron. This grade was developed for use as an armor plating. The iron reduces the amount of vanadium needed as a beta stabilizer. Its mechanical properties are excellent, and good cold workability properties;
m. 15% molybdenum, 3% aluminum, 2.7% niobium, and 0.25% silicon;
n. 0.3% cobalt and 0.05% palladium;
o. 5% aluminum, 1% tin, 1% zirconium, 1% vanadium, and 0.8% molybdenum;
p. 0.4% nickel, 0.015% palladium, 0.025% ruthenium, and 0.15% chromium;
q. 4.5% aluminum, 2% molybdenum, 1.6% vanadium, 0.5% iron, and 0.3% silicon;
r. Alloys of Ti and niobium, such as 45% niobium;
s. Alloys of Ti and aluminum, such as comprising 1.5% aluminum; and
t. Ti-6Al-7Nb. This alloy was developed as a biomedical replacement for Ti-6Al-4V alloy because Ti-6Al-4V contains vanadium, an element that has demonstrated cytotoxic outcomes when isolated. Ti-6Al-7Nb contains 6% aluminum and 7% niobium.

Particle and Particle Size

In various embodiments, the Ti powders described herein should be small enough to be jetted through a standard inkjet nozzle without clogging. Generally the particle size should not exceed 1/20 of the nozzle diameter. As an example, if the nozzle diameter is 30 micron, then the particles should be smaller than 1.5 micron.

In certain embodiments. Ti used herein should have a particle size less than 10.0 microns, such as less than 7.5 microns, less than 5.0 microns, such as a particle size less than 4.0 microns, less than 3.0 microns, less than 2.0 microns, less than 1.5 microns, or less than 1.0 micron. In an embodiment, the particle size of the Ti powder ranges from 100 nm to 1.0 micron. It has been discovered that submicron Ti particles allow stable ink to be produced because the effect of Brownian motion on ink stability is generally limited to light particles only, with nano-particles (defined as 100 nm or less), being of particular interest in certain applications. In an embodiment, the particle size of the Ti powder ranges from 50 nm to 100 nm. It has been found that Ti particle sizes within the foregoing ranges allow proper jetting, and prevent the jetting nozzle from clogging.

In an embodiment, the Ti used herein has a multimodal particle size distribution, such as bimodal distribution. The above described particles sizes are average particle diameters as determined using standard measurement techniques. For example, in one embodiment, the average particle size can be determined by examination of dry Ti powder with a scanning electron microscope (SEM). The average particle diameter may be an average value of the diameters of randomly selected particles, wherein the particle diameter is a Feret diameter measured in a fixed direction.

Particle size is also important for high print resolution. Generally the particle size should not exceed 1/10 of the pixel size in the printed image map. As an example, when the pixel size is 15 micron, then the particles should be smaller than 1.5 micron. Agglomeration of the particles is allowed (though not desired) but the size of the individual particles should still allow for the overall size of the agglomeration to be consistent with the above described particle sizes. For example, the overall size of the agglomeration should be less than 10.0 microns, such as less than 7.5 microns, less than 5.0 microns, such as a particle size less than 4.0 microns, less than 3.0 microns, less than 2.0 microns, less than 1.5 microns, or less than 1.0 micron. In addition to particle size, the oxygen content in the disclosed Ti powder is a consideration for ink jet printing operations. As explained in more detail below, oxygen content is also a function of the Ti particle size.

Oxygen Content of Metallic Titanium

Titanium (Ti) metal is a rather reactive element forming compounds with oxygen, carbon or nitrogen. This is especially true for fine powders with a large specific surface area due to the small particle size. One reason that such powders are not oxidizing entirely is the passivating nature of an instantly formed oxide layer on the particle surface in the presence of oxygen, which prevents further oxidation of the bulk metal. For example, in the alloy Ti64, the oxygen content is consistent with the material standard of commercially available Ti64, such as 0.2 weight % or below. While the amount of oxygen which is introduced due to particle surface oxidation remains below the 0.2% for larger particles, such as particles with a diameter of tens of microns, the same is not true for smaller powders suitable for inkjet printing. The ratio of surface oxide to particle bulk increases with a particle size distribution in the micrometer, sub-micrometer and nanometer regime.

An example calculation is shown in FIG. 1, which shows the oxygen content in a powder as a function of the particle diameter (blue line). For the calculation it was assumed that the particles are spherical and that they are covered by 5 atomic layers of $TiO_2$ with the rutile structure. It can be seen that in the sub-micrometer regime the oxygen content of a powder can already be above 0.2 wt % (red line) due to surface oxidation. It should be mentioned that the graph shifts slightly if another $TiO_2$ structure (amorphous, anatase, brookite) and a different oxygen layer thickness are assumed.

The disclosed ink compositions are based in part on the ability to passivate the Ti powders. For example, by dispersing the Ti component in a solvent, such as an organic solvent, together with a dispersing agent that connects to the Ti particles, the resulting powder is less reactive, is less likely to oxidize, and is less flammable. As shown in FIG. 1, micron or submicron Ti particles, while desirable for printing, are typically easily oxidized in oxygen atmosphere. The ability to mill Ti particles to a micron or submicron size in a solvent and dispersing agent leads to stable ink compositions.

The Inventors have discovered that by using a Ti containing powder, such as pure Ti or a Ti alloy described herein, that has been reacted with hydrogen to form a Ti hydride powder and dispersed in a solvent, the resulting material can be processed into stable Ti containing inks for ink jetting applications. In addition, because the resulting Ti hydride material is brittle from the hydrogenation processing conditions, it can be easily milled to a particle size sufficient for ink jetting, which is less than 10 microns, less than 7.5 microns, less than 5.0 microns, less than 2.0 microns less than 1.5 microns, less than 1.0 microns, such as a size ranging from 100 nm to 1.0 micron. As shown in FIG. 1, such small particle sizes would be expected to result in undesirably high oxygen concentrations, if not for hydrogen saturation. In addition, the light weight associated with such small particles that resist settling in a liquid carrier, thereby leading these chemically stable particles to form a physically stable ink composition when dispersed in a liquid carrier.

Liquid Carrier

To form the disclosed ink compositions, the hydrogenated Ti particles described herein are mixed in and thus coated with an appropriate compound that will help during the dispersing process. This allows the coated particles to be wet milled/grinded in a solvent mix to produce a Ti hydride having the appropriate particle size for jetting as previously described. Thus, in the inks described herein, a liquid carrier is used to support the dispersion of the Ti particles. Non-limiting examples of liquid carriers include non-polar liquids such as organic liquids, water (a polar liquid), and mixtures thereof. When the liquid carrier is an organic liquid, the ink is referred to as "solvent-based." When the carrier vehicle is water, the ink is referred to as an "aqueous" or "water based" ink. In every dispersion the liquid has a dissolving power per at least one edge of the dispersant molecule, with the other edge adhering to the particle surface.

The liquid carrier may include a blend of liquids, enabling proper control of parameters, including, for example, evaporation rate, dwell time, viscosity, and surface tension. The liquid carrier evaporates quickly after printing so that the subsequent layer is deposited on a solid layer. To achieve this characteristic, the liquid carrier has a boiling point at or below the temperature of the object surface during printing, while also allowing for proper ink viscosity at the print head temperature. Solvent mix with an average boiling point ranging from 100 and 320° C., such as ranging from 170 and 250° C. can be used. Viscosity of the liquid carrier should be of 8 to 30 cPs at jetting temperature, such as from 10 and 17 cPs.

Non-limiting examples of liquid carriers that can be used in the present disclosure include glycol ethers, and water soluble liquids such as ethylene glycol, and propylene glycol. Glycol ethers, such as propylene glycol or ethylene glycol series from Dow® Chemical, Dimethoxyethane, also known as glyme, monoglyme, dimethyl glycol, ethylene glycol dimethyl ether, dimethyl cellosolve) series from Clariant and their mixtures could be used. In this manner, one can reach a wide range of boiling points for the carrier vehicle (ranging from 100° C. to 320° C.). In one embodiment, the amount of liquid carrier in the ink ranges from 30 to 80 weight percent of the ink, such as from 40 to 60 weight percent of the ink, 35 to 75 weight percent of the ink or even 45 to 55 weight percent of the ink Dispersing Agents The inks described herein may further comprise one or more dispersing agents, such as surfactants, that enable the individual particles to stay isolated from other particles in the dispersion. In one embodiment, the dispersing agent comprises a composition which has affinity to the Ti particle surface and prevents the aggregation of the dispersed Ti particles, by at least one steric, electrostatic or electrosteric stabilization mechanism.

The dispersing agent should also be compatible with the liquid carrier, for stability purposes. In water based inks, for example, the stabilization can be achieved by proper control of the surface properties, such as by changing the pH of the dispersion. It should be noted that the stabilizer may be bound to the particles' surface by covalent bonds or by physical adsorption. The dispersing agent should also be such that it may be removed from the printed object prior to or during any desired post processing stage, and specifically during heat treatments to the printed object, such as pre-sintering or sintering. Partial removal of the dispersant may take place on a hot printing chuck to allow partial sintering to create a brown article. Sintering temperature of the particles is a function, among other things, on the particles size. A mix of nano particles and micro particles size may enhance partial sintering since nano particles tend to melt at a lower temperature. By removing the dispersing agent, sintering between Ti particles can proceed without interference or contamination by particles of the dispersing agent. Additionally, with the dispersing agent removed, the formation of "islands" of dispersing agent particles within the printed object, which will weaken the resulting solidified 3D structure, is prevented. Polymeric dispersants and other non-volatile compounds are typically burned or fired off, during post printing process.

Non-limiting examples of dispersing agents include: Disperbyk 180, Disperbyk 190, Disperbyk 163 from Byk Chemie. Solsperse 39000. Solsperse 33000, Solsperse 35000 from Lubrizol. Rheosperse 3020, 3450, 3620 from Coatex (Arkema), Efka 7701, Efka 7731, Efka 7732 from BASF.

Ionic dispersing agents include, for example, SLS (sodium lauryl sulfate), CTAB (cetyl tetraammonium bromide). AOT (dioctyl sulfosucinate) and fatty acid such as oleic acid.

When an ink described herein further comprises a dispersing agents (or "dispersant"), it may be found in an amount ranging from 1 to 10 weight percent of the Ti (i.e. $TiH_2$) particles. The exact amount of the dispersant, depends on the dispersing power of the agent and the quality of the mixing tool, and also on the attaching property of the dry material. These can all affect the resulting ink properties, such as viscosity.

Surface Modifiers

Surface modifiers add properties such as scratch resistance and controlling the interface with the printed object. Exemplary surface modifiers include cellulosic polymers such as ethyl cellulose, carboxymethyl cellulose, hydroxypropyl methyl cellulose, cellulose acetate. Other surface modifiers may include polybutyrals (from Butvar).

When present in the support ink, the surface modifiers may be from approximately 0.1 to approximately 5 weight percent of the support ink, depending on the resulting ink properties, such as viscosity.

Support Inks

An embodiment of the present disclosure is directed to inks, typically used in 3D (three dimensional) printing operations, which serve as a support material or support ink for the Ti containing inks described herein. This support ink is designed to fill spaces in the printed Ti object, shielding these spaces from particles which may drift into such regions during post printing processing. The support ink is also used, for example, in a manner analogous to a mold. The support ink provides a ground for printing of a model ink layer on regions which at the end should remain empty. e.g. the space under a free standing arc.

For example, for printing a Ti-based object, the support material may remain as an integral part of the finished Ti product to form a multi-component material. Alternatively, the support material is removed once the object has been printed, and typically prior to any post printing processes, including heat treatments such as sintering. Alternately, the support structure printed with the support ink may remain with the printed object during post printing processes. In these cases, the support structure of the support ink must remain sufficiently soft and/or brittle to be removable after the sintering process. The metal composition of the final object is similar or close to that of the initial ink, but in some embodiments it can be different than the starting composition, due to the loss of some of the material during the printing process.

A more detailed description of the support materials is described in WO2015056232 A1 (Patent Application number PCT/IB2014/065402), which is herein incorporated by reference. Support inks, according to the embodiments disclosed herein, comprise chemical entities including solid particles, for example, dispersed in carrier vehicles, dispersing agents (dispersants) and additives described herein.

Solid Particles for Support Material

Particles are such that one or more types of particles may be mixed together. Particle sizes are Indicated by diameters, where not specifically indicated. The particles range in diameter from nanometer scale, e.g., (approximately 10 nm to approximately 300 nm), to submicron (approximately 0.4 μm to approximately 1 μm), and provide the general features of the support.

In various embodiments, the solid particles comprise one or more of: inorganic salts, metal carbides, metal oxides and polymers. Optionally, the solid particles are miscible or at least partially soluble in water, basic, or aqueous acidic solution.

Non limiting examples of the inorganic salts that can be used as solid particles include calcium carbonate, calcium sulfate, magnesium sulfate, sodium carbonate or sodium bicarbonate.

Non limiting examples of the metal oxides that can be used as solid particles include zirconium oxide, zinc oxide, magnesium oxide, Silicon Oxide (silica), Aluminum Oxide (alumina), Titanium Oxide (Titania) or Yttrium Oxide (Yttria).

Non limiting examples of the metal carbides that can be used as solid particles include silicon carbide, tungsten carbide, and titanium carbides.

Non-limiting examples of metal nitrides that can be used as solid particles include boron nitride, silicon nitride, tungsten nitride, and titanium nitride.

Non limiting examples of the polymeric materials that can be used as solid particles include polyethylene, polypropylene, polymethylpentene polystyrene, polyamides (Nylon), polyoxomethylene. Example polymeric particles include nylon 6,6 and branched substituted polyolefin such as polystyrene and polyalkylpentene (e.g., poly (4-methyl 1-pentene)).

In exemplary ink compositions, the solid particles themselves are present typically between approximately 15 to approximately 60 weight percent of the ink composition. Examples of the solid particles listed above are suitable for use in accordance with the following exemplary dispersions.

Titanium Oxide (Titania, $TiO_2$) particles (of approximately 20 nm to approximately 300 nm in diameter) are typically dispersed in a solvent. An exemplary dispersion is prepared as a mixture of 50+2 wt % (weight percent) rutile titania powder (Commercially available from Kronos) in glycol ethers and stabilized with a polymeric dispersant (3 wt % on solid particles). Tungsten Carbide (WC) particles are in a dispersion which includes 45+2 wt. WC powder (0.8 micron WC powder, available from General Carbide Corporation, Greensburg, Pa. USA) in glycol ethers, and stabilized with a polymeric dispersant of up to approximately 5 wt % on WC particles). Titanium oxide particles could be also prepared by sol-gel technics to yield spherical particles with controlled size distribution and controlled porosity.

Solid Anhydrous Calcium Sulfate ($CaSO_4$) (approximately 44 micron particles of approximately 325 mesh) from Sigma-Aldrich were ground to unknown micron range particles that passed through a 3 μm filter) approximately 20 to approximately 30 wt % in a Glycol Ether solvent mixture approximately 65 to approximately 80 weight percent (wt %) with a combination of ionic (approximately 1.5 to approximately 2.5 weight percent (wt %)) and polymeric (approximately 1 to approximately 2 weight percent (wt %)) dispersants.

Method of Making the Disclosed Inks

Figure 2:
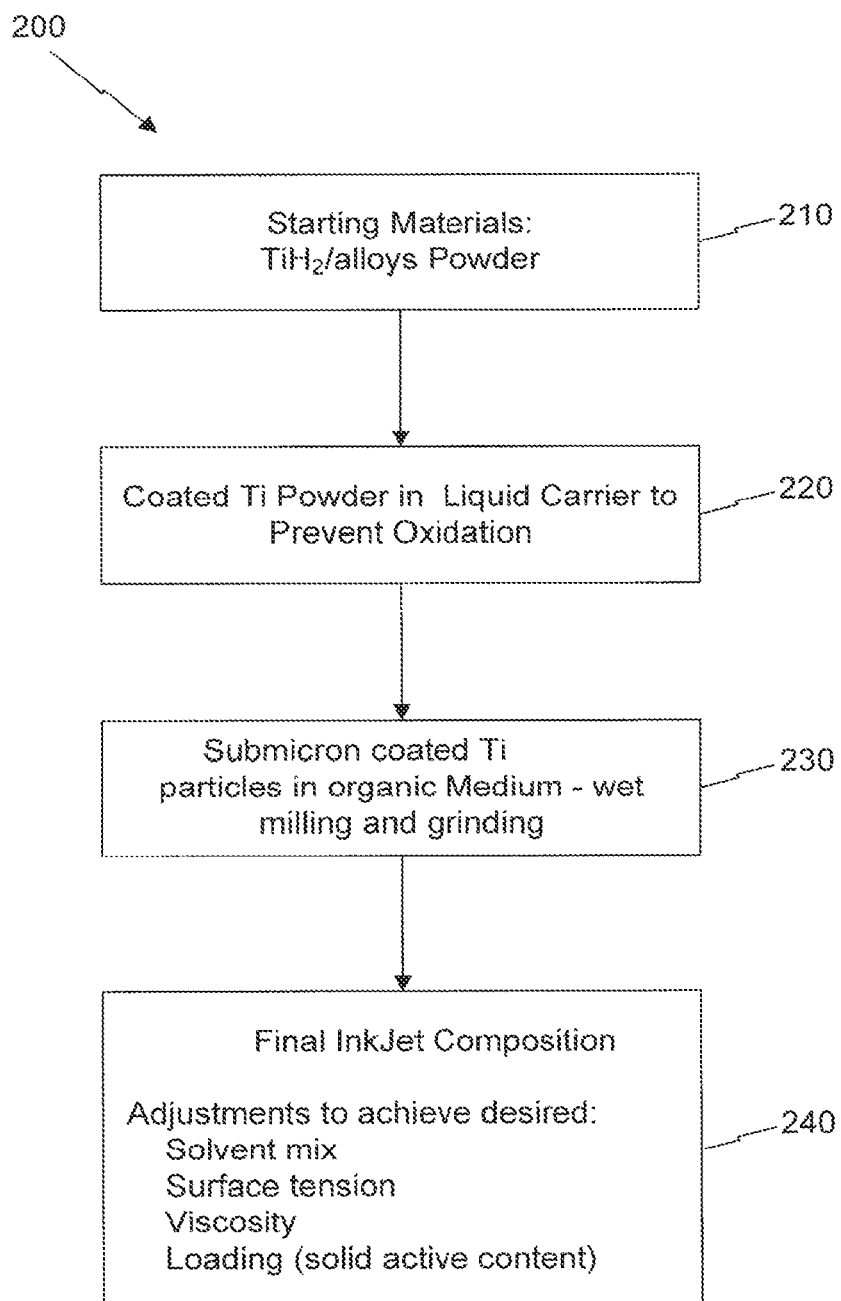
FIG. 2 is a flow chart illustrating steps of a method of making an inkjet composition as described and embodied herein.

As described, the Ti used in the inventive inks, may include one or more of the pure Ti or Ti alloys. In an embodiment, and with reference to FIG. 2, the method of making an ink according to the present disclosure starts with making the raw Ti material, for example, a hydrogenated Ti raw material (step 210). The raw material may optionally comprise a large surface to volume ratio, so as to increase penetration rate of hydrogen in the material. For example, the Ti material comprises particles ranging in size from 50 to 500 micron. In an embodiment, the particles comprise an alloy Ti64 (i.e. 6% weight aluminum and 4% vanadium in Titanium).

Hydrogenation can be done by heating Ti particles in $H_2$ high pressure environment, for example, at a hydrogen pressure and temperature of 2 Bars and 400° C. for 1 hour. At equilibrium, a ratio of roughly 2 to 1 is obtained between H and Ti atoms in the particles. The resulting $TiH_2$ particles then dispersed in a liquid medium which coats them, and protects them from oxidation (step 220). In addition, as the Ti hydride particles are brittle, they can readily be milled to smaller particles. Wet milling of these Ti hydride particles allows the formation of submicron particles with no fear of reactions, because the hydrogen saturated Ti material is protected from oxidation (step 230). This also allows the subsequent processes (except the final step of increasing the temperature to above 300° C.) to be carried out without a need of inert environment throughout the process. In another embodiment, $TiH_2$ particles useful in the present disclosure can be readily bought from Phelly Materials Inc, 15 Industrial Av., Upper Saddle River, N.J. 07458.

The $TiH_2$ particles produced or purchased, as described above, can then be processed into an ink composition using the following steps once the $H_2$ saturated Ti material has been milled to small particle size (step 230). The milled particles generally comprise sharp edges as expected from broken substance, which is later utilized for initiation of initial sintering that holds printed parts in their required shape until final sintering.

If necessary, the milled particles can be screened and filter (i.e. sieved) to collect the particles of the desired size, such as, for example, a distribution smaller than 1.5 micron. As explained, in another non-limiting embodiment the Ti particles may also comprise a bimodal particle size distribution, such as a mix of mix of nano-sized and micro-sized particles. As used herein, nano-sized particles mean a size ranging from 10 nm to less than 1 micron, and micro-sized particles means greater than 1 micron, such as 1 to 10 microns.

In one embodiment, milling and dispersing are done together in one step. In this embodiment, the particles, the liquid carrier and dispersing agent are fed into a mixing-grinding machine, e.g. a ball mill or high sheer mixer, which mixes and grinds the material until the particles reduce in size and also become wrapped with the dispersing agent (and therefore do not agglomerate). At a later step, the mixed fluid material flows through a particle filter, such as one having 1.5 micron diameter holes, which separates out particles larger than a desired size, e.g., 1.5 microns.

The ink formulation can include any of the previously described Ti particles, such as dominantly pure Ti, or an alloy such as Ti64 or $Ti64H_2$, to produce a stable ink. As used herein, "stable" means that the particles stay separate from each other, and thus, due to Brownian motion, sinking is substantially prevented for an extended period of time.

In addition to the Ti particles, liquid carrier, and dispersing agent, making the final ink formulation may include adding other various additives to achieve desired properties (step 240). For example, ink formulation may be adjusted to improve jetting behavior (i.e. interaction with the jetting head) or layering performance (i.e. interaction with the printed surface) such as wetting and leveling agents, rheological agents, and binders. Examples of polymeric binders could be taken from the following non exhaustive list: polyacrylic acid derivatives like Joncryl 567, 581, polyvinylpyrrolidone from BASF, polyvinyl butyrale B72, B90, B98 from Eastman. Total amount in the entire formulation should be comprise between 0.1 and 3 wt %, such as 0.5 and 1.5 wt %. Leveling agents could be Tego Wet 270, 280, KL245 from Tego, Efka 3077, Irgaflow 100 from BASF. Usually levelling agent content ranging from 0.1 to 0.5 wt %, but in some cases larger amount could be used. Rheological additives could be taken from Tego (Viscoplus 3060, 3030). BASF (Rheovis 152, 162), Byk 431, 430 from BYK Chemie. Concentrations of rheological additives will be comprised between 0.1 and 1 wt % of the entire formulation. Drying behavior during printing is also something that should be considered. To this end, certain additives can be added to improve ink behavior such as cracks formation during drying, adhesion to the substrate, and interactions with support ink.

In an embodiment, the viscosity of the inks produced herein ranges from 10-25 cP (centi-Poise) at the jetting head temperature of 25-60° C. In addition, the surface tension of the inks produced herein ranges from 25-45 mN/m (millinewton per meter). The viscosity and surface tension values within these ranges have been found to be beneficial for the ink to be properly jetted by inkjet heads.

INDUSTRIAL APPLICABILITY—MAKING A TI ARTICLE

The disclosed ink compositions are used to print Ti-based parts layer by layer in accordance with the object's digital layers, as developed by known techniques, such as a 3D printable model created using computer aided design (CAD) software. Prior to printing, a digital description of the object is converted to a stack of digital layers from bottom to up. A more detailed description of the systems and methods for printing 3D objects using the disclosed inks can be found in WO2015056230 (PCT/IB2014/065400), which is herein incorporated by reference.

Figure 3:
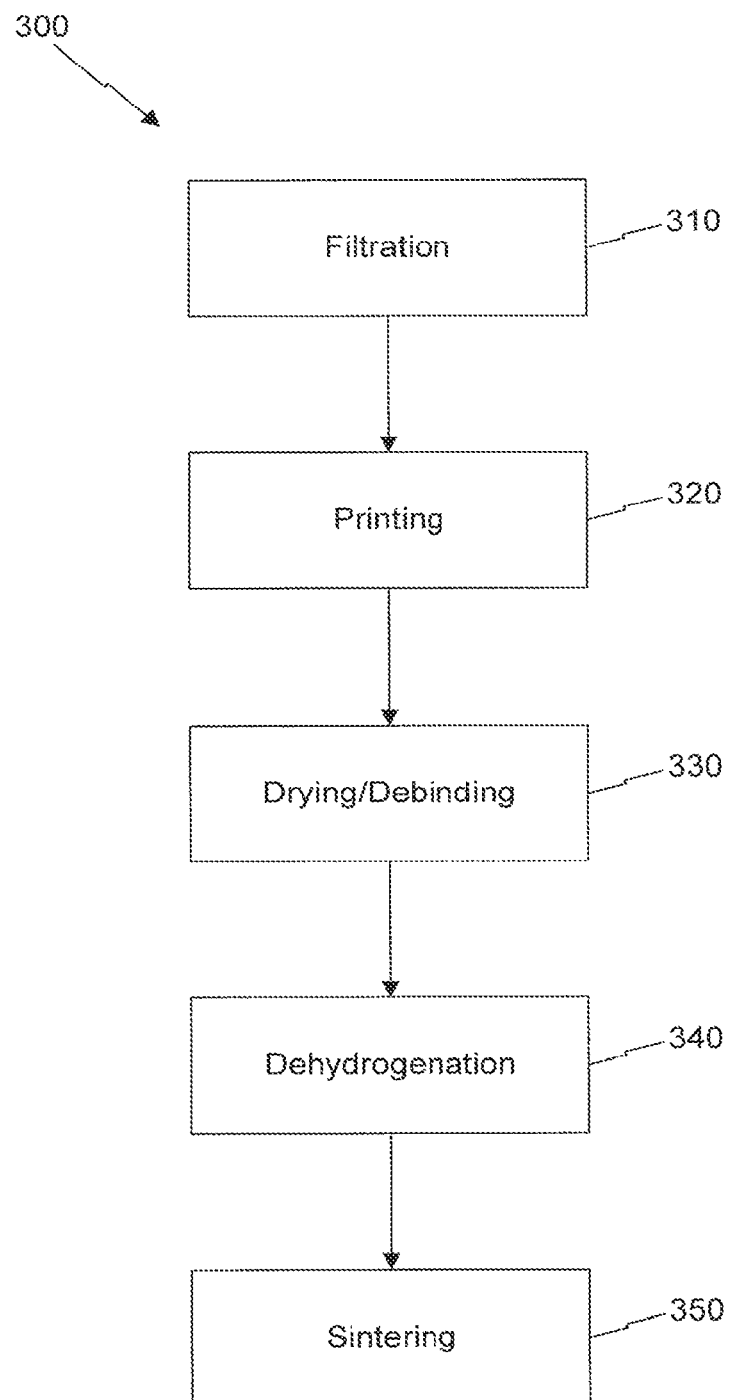
FIG. 3 is a flow chart illustrating steps of a method of printing a Ti article using an inkjet composition made by the method shown in FIG. 2.

With reference to FIG. 3, making a final Ti article can start by filtering the ink formulation to insure that the final ink contains Ti particle sizes sufficient for printing, without clogging the nozzle of the inkjet head (step 310). In one embodiment, printing the liquid ink can occur by using one or more inkjet heads, each of which may comprise a single jetting nozzle or an array of jetting nozzles (step 320). As mentioned, because of the stability in the Ti powder, as well as in the ink itself, there is no need to have inert environment throughout printing.

In another embodiment, a dispersion of solid particles in a liquid carrier, such as metal, ceramic, or polymeric material, can be used as support material. Upon evaporation of the liquid carrier, a matrix of solid particles can be formed. The particular solid particle should remain solid at printing temperature in order to be able to physically support the printed object.

Support inks, according to the embodiments disclosed herein, comprise dispersed particles of solid materials in a carrier liquid. The dispersions are formulated to be printable by inkjet heads, i.e. having the viscosity, surface tension and particle size meeting inkjet requirements. When jetted from the inkjet head, on a heated tray, the liquid carrier evaporates, and the remaining particles form a solid layer. Applying a layer by layer methodology forms a 3D object of the solid material supported by the invented support material. The solid particles which form the supporting materials are dispersed in the liquid carrier by suitable dispersing agents (dispersants). A dispersing agent is capable of covering the solid particles via chemical or physical interactions. The interface of the covered particle is changed in such a way that the covered particles can remain in solution rather than precipitate.

During printing, after the liquid carrier evaporates, the dispersant remains on the particles and serves as a binder that prevents the solid matrix form from collapsing. The dispersing agent is, thus, being debound during the thermal process of sintering, which is described in more detail below.

In an embodiment, the solid particles described herein, and which are used to form the solid matrix, remain as an integral part of the finished, printed Ti-containing article. For example, in an embodiment, the Ti-containing article made according to the disclosed process comprises at least one additional material, such as a metal oxide, a ceramic, or a polymer. Non-limiting examples of the a metal oxides or ceramics that can be used herein includes zinc oxide (ZnO), magnesium oxide (MgO), zirconia ($ZrO_2$) silica ($SiO_2$), alumina ($Al_2O_3$), titania ($TiO_2$), and yttria ($Y_2O_3$).

In one embodiment, the finished Ti containing part may comprise a printed Ti/metal component part. Non-limiting examples of a metal carbide that might be printed with the part include one or more of: silicon carbide, tungsten carbide, and titanium carbide. In one embodiment, the metal carbide may remain as part of the finished product to form a Ti and metal carbide article.

The metal component might comprise a metal nitride. Non-limiting examples of such metal nitrides that can be used herein include boron nitride, silicon nitride, tungsten nitride, titanium nitride, and combinations thereof. In one embodiment, the metal nitride may remain as part of the finished product to form a Ti and metal nitride article.

In one embodiment, the finished Ti containing part may comprise a printed Ti/polymer part. Non-limiting examples of the polymer material that might be printed with the part include one or more of: polyethylene, polypropylene, polymethylpentene polystyrene, polyamides (Nylon), and polyoxomethylene. In one embodiment, the polymer may remain as part of the finished product to form a Ti and polymer article.

The printed article is generally a fragile and partly dry object having substantially the final desired shape, although it could be different in scale. The partially dried object is subject to an initial heating step to remove the binder (step 330), which could interfere with subsequent heat treatment steps, including dehydrogenation and sintering.

At this stage, the printed article can be called "green". As used herein, "green" objects, "green bodies" and "green parts" are used interchangeably to describe articles or parts printed with the disclosed inks by the disclosed printing techniques, but prior to any post processing treatments, typically heat treatments, such as sintering.

To obtain a final part from this green part, debinding, dehydrogenation and sintering are performed on the printed material (step 330-350). This involves heating up the green object in an oven, typically under reducing atmosphere or inert atmosphere or vacuum. This step includes reducing the amount of hydrogen in the object in a planned pace to prevent crack formation. Proper pace enhances improved object attributes like tensile strength and fatigue. Reducing the H content is done by increased temperature in the oven under reduced $H_2$ partial pressure, and optionally done in an inert environment (e.g. Argon). Complete removal of H is required to avoid brittleness. In one embodiment, dehydrogenation can be achieved at temperatures ranging from 400-700° C., depending on the partial $H_2$ pressure.

After dehydrogenation, sintering of the dehydrogenated part occurs (step 350). This step involves a further increase of the temperature above the dehydrogenation temperature, generally in the same oven and as a continuous process following the dehydrogenation step. In one embodiment, the sintering temperature ranges from 950° C. to 1300° C., such as from 1000° C. to 1250° C., or even 1100° C. to 1200° C.

Typical sintering times typically range from 1 to 8 hours, such as 2 to 6 hours, or 3 to 5 hours. Typically sintering times decrease with increasing temperatures such that lower temperatures lead to longer sintering times. The sintered part is typically cooled to room temperature in the sintering furnace to avoid oxidation of a hot Ti alloy.

It will be apparent to those skilled in the art that various modifications and variations can be made to the disclosed inks and methods of forming titanium parts using ink jet printing techniques, without departing from the scope of the disclosure. Alternative implementations will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. An ink composition comprising,
   a liquid dispersion of: Ti hydride powder having a mean particle size of less than 10.0 microns;
   a liquid carrier; and
   at least one surfactant, wherein the Ti hydride powder is a Ti alloy comprising Ti—Al6-V4 alloy.

2. The ink composition of claim 1, wherein the liquid carrier is solvent based or water based.

3. The ink composition of claim 2, wherein the solvent-based liquid carrier comprises glycol ethers, water soluble liquids chosen from ethylene glycol, and propylene glycol, or any combination of the foregoing.

4. The ink composition of claim 2, wherein the liquid carrier comprises 30 to 80% by weight of the ink composition.

5. The ink composition of claim 1, wherein the Ti hydride powder has a mean particle size ranging from 100 nm to 2.0 micron.

6. The ink composition of claim 1, wherein the Ti hydride powder comprises a mixture of nano-sized and micro-sized particles.

7. The ink composition of claim 1, which exhibits a viscosity ranging from 10-25 cP at a temperature ranging from 25-60° C.

8. The ink composition of claim 1, which exhibits a surface tension ranges from 25-45 mN/m at room temperature.

9. The ink composition of claim 1, wherein the at least one surfactant is present in an amount ranging from 1 to 10% by weight of dispersed Ti particles.

10. The ink composition of claim 1, further comprising one or more additive chosen from a wetting agent, a leveling agent, a rheological agent, a binder, and combinations thereof.

* * * * *